United States Patent
Feldmann et al.

(10) Patent No.: US 6,354,671 B1
(45) Date of Patent: Mar. 12, 2002

(54) BRAKE SIGNAL TRANSMITTER WITH INTEGRATED ADDITION REDUNDANCY

(75) Inventors: Joachim Feldmann, Neustadt; Bernd Kiel, Wunstorf, both of (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 09/438,709

(22) Filed: Nov. 11, 1999

(30) Foreign Application Priority Data

Nov. 13, 1998 (DE) .......................................... 198 52 399

(51) Int. Cl.$^7$ .............................................. B60T 13/70
(52) U.S. Cl. ................................ 303/15; 303/3; 303/20
(58) Field of Search .............................. 303/9.62, 3, 5, 303/20, 40, 15; 137/627.5; 251/129.03

(56) References Cited

U.S. PATENT DOCUMENTS

| | | | | |
|---|---|---|---|---|
| 4,436,347 A | * | 3/1984 | Stumpe | 303/15 |
| 4,616,881 A | * | 10/1986 | Muller et al. | 303/7 |
| 4,818,036 A | | 4/1989 | Reinecke | 303/50 |
| 4,861,115 A | * | 8/1989 | Petersen | 303/15 |
| 5,145,239 A | * | 9/1992 | Meise et al. | 303/15 |
| 5,163,742 A | * | 11/1992 | Topfer et al. | 303/155 |
| 5,294,190 A | | 3/1994 | Feldmann et al. | 303/3 |
| 5,333,940 A | * | 8/1994 | Topfer | 303/15 |
| 5,380,073 A | | 1/1995 | Bartscher et al. | 303/9.72 |
| 5,567,021 A | * | 10/1996 | Gaillard | 303/3 |
| 5,615,931 A | * | 4/1997 | Stumpe et al. | 303/22.1 |
| 5,718,486 A | * | 2/1998 | Vollmer et al. | 303/3 |
| 6,206,481 B1 | * | 3/2001 | Kaisers et al. | 303/7 |

FOREIGN PATENT DOCUMENTS

| | | |
|---|---|---|
| DE | 3308279 | 9/1984 |
| DE | 3543331 | 6/1987 |
| DE | 3611941 | 10/1987 |
| DE | 4232146 | 3/1994 |
| DE | 4343314 | 6/1995 |
| DE | 19653264 | 6/1998 |
| EP | 447750 | 1/1991 |

* cited by examiner

Primary Examiner—Matthew C. Graham
Assistant Examiner—Mariano Sy
(74) Attorney, Agent, or Firm—Proskauer Rose LLP

(57) ABSTRACT

A brake signal transmitter for an electronic braking system produces an electrical braking requirement signal as well as a mechanically produced pneumatic braking pressure. The electronic braking requirement signal is evaluated, together with other measured magnitudes which define the travel state, in an electronic vehicle control system, and a braking pressure is produced as a function of this evaluation by a braking pressure modulator. Following the principle of addition redundancy, the pressure produced mechanically by the brake signal transmitter is added to the pressure produced electrically by the brake modulator and the total pressure represents the braking pressure acting on the brake cylinders. In the event of failure of the electronic system, the mechanically produced pressure automatically becomes active as the braking pressure, and functions as the redundancy pressure. An addition device is provided within the brake signal transmitter itself, in which the pressure produced mechanically by the brake signal transmitter and the pressure produced electrically by the brake signal transmitter are added together. The electric braking pressure modulator may be part of the brake signal transmitter or, can be located outside the brake signal transmitter, and the pressure supplied thereby can be transmitted to the brake signal transmitter.

22 Claims, 6 Drawing Sheets

BRAKE SIGNAL TRANSMITTER WITH INTEGRATED ADDITION REDUNDANCY

BACKGROUND OF THE INVENTION

The present invention relates to a brake signal transmitter with integrated addition redundancy.

A brake signal transmitter of conventional design is disclosed, for example, in German patent DE-A1-33 08 279, in which it is termed a "motor vehicle brake valve."

The disclosed brake valve is designed to primarily effect electrical braking in a towing vehicle. For this purpose, a magnetoresistive displacement transmitter is provided, which emits a measuring signal for an electrically controlled brake, i.e. the operating brake of the vehicle. Such signal is dependent upon the actuation of a pedal plate. When the pedal plate is actuated, a braking pressure is also initiated in a pneumatic circuit. The braking pressure within such pneumatic circuit acts upon the brake cylinder preferably only in the event of failure of the electrical circuit. The pneumatic circuit thus represents a redundancy in addition to the electrical circuit.

A mechanically functioning apparatus for the production of a first pneumatic braking pressure component which acts preferably as a redundancy pressure, and an apparatus for the production of an electrical measuring signal for a second, electrical, braking component which is put into effect by priority, is taught in the literature.

A braking pressure modulator consisting of a two-circuit triggered relay valve system and a magnetically actuated valve system is disclosed, for example, in European patent EP-B1-0 447 750 (corresponding to U.S. Pat. No. 5,294,190 which is incorporated herein by reference). The relay valve system employed therein is of accumulating design normally available on the market. Used in such context, the term "accumulating" means that the two control devices of the relay valve system produce a higher pressure at their outputs when subjected to pressure at the same time than when only one of the control devices is subjected to pressure.

The magnetically actuated valve system is designed so that it emits a pressure which is determined as a function of the supplied magnetic current strength. The two-circuit triggered relay valve system (identified by reference numeral 44 in FIG. 4 of European patent EP-B1-0 447750) is controlled by the pressure produced by the magnetically actuated valve system (reference numeral 40 in FIG. 4 of EP-B 1-0 447 750), as well as by a mechanical braking pressure system (reference numeral 5 in FIG. 4 of EP-B1-0 447 750). The pressure produced by the two-circuit triggered relay valve system represents the braking pressure. The two-circuit triggered valve system thus adds the influences of the pressure appearing at its two inputs by producing a braking pressure augmented by a quantity of air, the level of which depends on the sum of the two input pressures. Such valve system therefore contains an addition element for the formation of the sum.

Relay valves of conventional form generally include a relay piston, the piston surface of which serves as the active surface for a pre-pressure applied to a pneumatic control input thereof. The excursion of the relay piston actuates an air admission and venting valve in such manner that the end position of both valves is attained when the generated pressure has become equal to the pre-pressure.

Two control inputs are provided for a two-circuit triggered relay valve, and each pre-pressure applied to these control inputs acts upon the relay piston via an active surface. Assuming identical active surfaces for both control inputs, it is essential that a force be applied to the relay piston which is equal to the sum of these two pre-pressures. The relay piston therefore constitutes the addition element. The addition is effected by an equilibrium which is established on the relay piston between the force of the generated pressure exerted upon the relay piston and the forces exerted upon it through the two pre-pressures.

The two pressures appearing at the two inputs of the two-circuit triggered relay valve system (identified by reference numerals 42, 43 in FIG. 4 of European patent EP-B1-0 447 750) thus represent the pre-pressures to be added. The corresponding pneumatic circuits of the units producing these pressures (reference numerals 40, 5 in FIG. 4 of EP-B1-0 447 750) serve for the transmission of air, the pneumatic pressure thereby assuming, in this instance, the function of a force transmission.

European patent EP-B1-0 447 750 furthermore discloses a brake signal transmitter located upstream of the braking pressure modulator for control thereof, the braking pressure modulator transmitting an electric actuating signal dependant upon the actuating force, or the actuation displacement, produced by the driver's foot acting upon an electric element of the brake signal transmitter, to the magnetically actuated valve system. At the same time, the brake signal transmitter controls the level of the redundant braking pressure from a pressure supply as a function of the braking pressure control system on the pressure part thereof representing the above-mentioned mechanical braking pressure control system.

The braking pressure emitted by the braking pressure modulator thus consists of the redundant braking pressure and a braking pressure component based on the magnetic actuation. It is a feature of European patent EP-B1-0 447 750 that the force of the magnetic current is adjusted such that the braking pressure component based on the magnetic actuation precisely amounts to the difference between the braking pressure requirement corresponding to the driver command and the braking pressure component based on the redundant braking pressure.

In order to reliably utilize the principle of the addition redundancy according to European patent EP-B1-0 447 750, it is necessary to provide a plurality of different components around the brake signal transmitter (identified by reference numerals 5, 6, 7 in FIG. 4 of EP-B1-0 447 750). A further disadvantage of the invention disclosed in EP-B1-0 447 750 is that, as described, pneumatic connections must be provided which serve merely for the force transmission to those devices which carry out the adding function. This applies particularly to the pneumatic connection which transmits the redundancy pressure produced in the brake signal transmitter based on the driver actuation to the adding device, which is provided in the form of a two-circuit triggered relay valve system (identified by the reference numerals 5 after 9 in FIG. 4 of EP-B1-0 447 750).

It is therefore the object of the present invention to provide a brake signal transmitter of the above-mentioned type which contains the controlling functions for the addition redundancy.

It is a primary object of the present invention to ensure that the pneumatic connections which are conventionally provided solely for the force transmission of a force component derived from the force of the foot acting on the brake pedal, or from the range covered by the brake pedal when acted upon to a device carrying out the addition, are no longer needed.

SUMMARY OF THE INVENTION

In accordance with these and other objects of the invention, there is provided a brake signal transmitter for a braking system installed in a vehicle which includes a vehicle control system. The brake signal transmitter includes an actuating device for actuation of the brake signal transmitter by the driver and a sensor device for detecting driver actuation of the actuating device. The sensor includes an output connected to an input of the vehicle control system. The brake signal transmitter further includes a pressure-producing device for producing a braking pressure in response to the driver actuation. Such pressure-producing device includes an input for a first physical magnitude derived from the driver actuation. The pressure-producing device further includes an additional input for a second physical magnitude derived from an output of the vehicle control system.

By virtue of the attendant simplification of the pneumatic system, components, such as pressure-controlling valve systems, can also be dispensed with. In addition to cost reduction, the omission of components also provides the advantage that reliability of operation is increased.

The invention provides the additional advantage that building space and weight are saved. The savings in building space allows the brake signal transmitter to advantageously be integrated, together with its peripheral components, into a pedal box which is produced in advance as a prefabricated system support in the vehicle.

In a further development of the invention, limitations resulting from the planning of force-range in order to achieve a desired "pedal feeling" while maintaining presently constant operating capability of the combination brake signal transmitter/pedal are obviated. In this regard, the invention offers the advantage that this operating capability is variable, and that the needs of a particular user can therefore be met, to a great extent, in the design phase.

The above, and other objects, features and advantages of the present invention will become apparent from the following description read in conjunction with the accompanying drawings, in which like reference numerals designate the same elements, and in which pneumatic connections are depicted in the form of continuous lines, and electrical connections in the form of broken lines.

DETAILED DESCRIPTION OF THE PREFERRED EMBODIMENT

Figure 1:
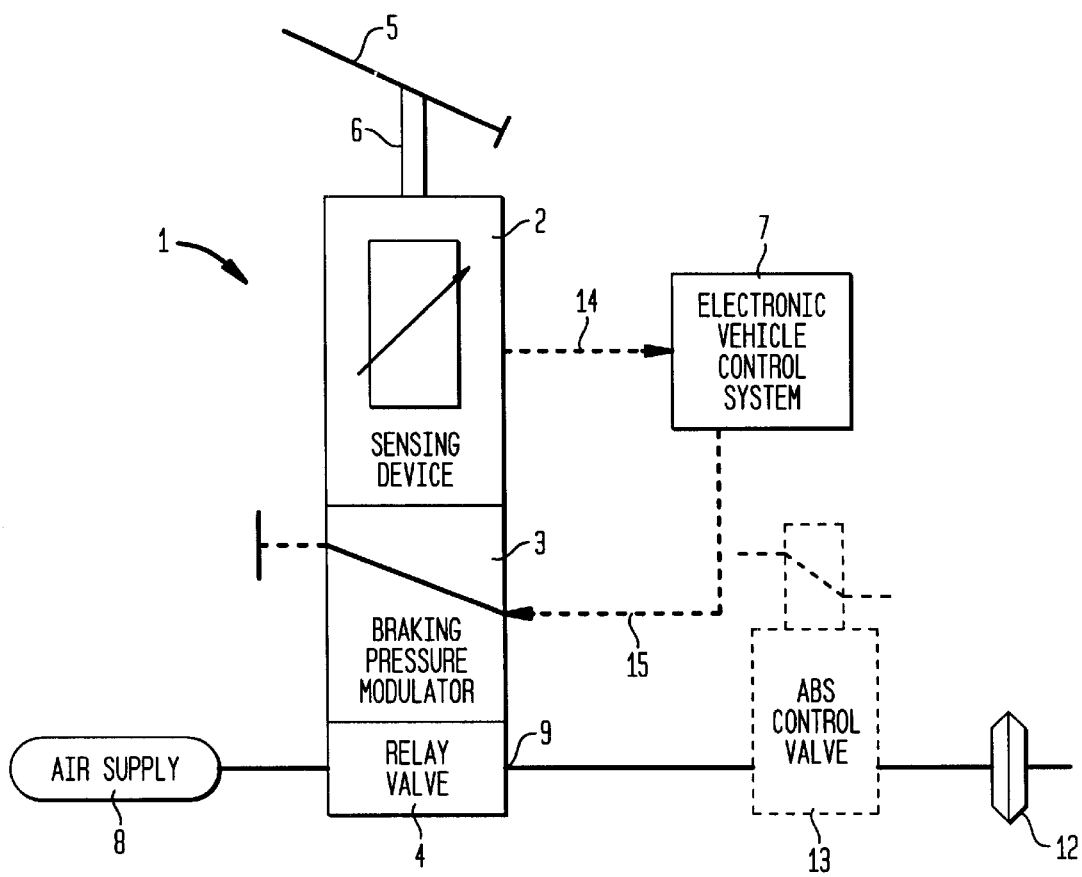
FIG. 1 is a schematic view of a brake signal transmitter in accordance with an embodiment of the invention shown with operating units thereof in a braking system.

Consistent with the regulations applicable to vehicles operable in public street traffic, such vehicles must be equipped with two brake circuits which can take effect independently of each other.

In utility vehicles with two braked axles, each which is braked by compressed air, the distribution of the independently acting brake circuits is normally designed in such manner that a first brake circuit is provided for the wheels of the front axle, and a second brake circuit for the wheels of the rear axle.

In vehicles employing conventional braking systems, a brake signal transmitter generally consists of a motor vehicle brake valve including two valve systems acting independently of each other, whereby one valve system actuates a pressure which acts upon the brake cylinder of the front axle, while the other valve system actuates a pressure acting upon the rear axle. Such a brake valve is disclosed, for example, in German patent DE-A1-42 32 146 (corresponding to U.S. Pat. No. 5,380,073, which is incorporated herein by reference). The intensity of the actuated pressure is determined by the displacement covered by, or the force of the brake pedal, which is actuated by the driver acting upon the brake valve.

In vehicles which, in contrast to a conventional air brake, are equipped with an electronic brake value control, the brake signal transmitter produces an electrical signal having a brake value requirement indicated by the driver. The braking force distribution among the axles is determined by the vehicle electronics, which electronically evaluates this electronic signal together with other parameters such as, for example, load. In this manner, electronic signals serving to actuate brake pressure modulators for the front axle and rear axle are formed by the vehicle electronic system.

For safety reasons, a redundancy in the form of a braking pressure produced entirely by mechanical means must be provided in vehicles with electronic brake value control. In the event of a malfunction in the electronic system, which may be caused, for example, by the failure of an electronic component, this redundancy becomes active in a braking process, and ensures that the vehicle will be braked.

A redundancy pressure can become active according to the principle of switched redundancy or the principle of addition redundancy. In the example of a switched redundancy, the redundancy pressure resulting from a call for a brake value is constantly produced and is used, instead of the braking pressure produced by the brake modulator, in the event of an electronic failure. To achieve this end, however, it is necessary to switch off the pressure associated with the brake modulator via an electrically actuated valve, and to switch on the redundancy pressure.

As an alternative to such required valve switching, the advance pressure of the braking pressure modulator can be used as a criterion for the switched redundancy. As long as the pressure produced by the braking pressure modulator amounts to some predetermined threshold amount, for example at least 0.2 bar, the redundancy is held off. However, if this is not the case, this retention is lifted and the redundancy pressure intervenes.

The process of switched redundancy requires, therefore, that a failed electronic system, or one in the process of failing, would still be able to reliably carry out certain switching or control processes. Consequently, special measures are advisably taken in the electronic system for this purpose, covering, as much as possible, all contingencies. To illustrate to how expensive such undertaking could become, a possible failure is considered by way of the following example. If a pressure sensor indicates a pressure of 10 bar instead of the actually present pressure of 0.2 bar (the predetermined threshold amount), the vehicle electronic system assumes that full braking takes place, while the vehicle, in reality, continues to travel without being braked. This error can of course also be detected, for example, by doubling up the sensors, but this again raises the manufacturing costs.

By comparison, with the principle of addition redundancy according to the aforementioned European patent EP-B1-0 447 750, the redundancy pressure is actively included as an additive component in every braking event. If the electronic system fails, the redundancy pressure acts directly upon the brake cylinder without the need for implementing any switch-over processes. As a result, the process is intrinsically safe, and thus offers a greater degree of safety than the process of switched redundancy.

A redundancy can be designed in one or two circuits. In case of a single-circuit redundancy, only one of the two braking circuits is provided with redundancy, and normally this is the front axle braking circuit, while both braking circuits are provided with redundancy in case of redundancy with two circuits.

The process of addition redundancy is especially advantageous in the case of a single-circuit redundancy on the front axle braking circuit. The front axle is constantly under the load of the weight of the engine gearing block, and therefore has a considerably more favorable load/empty ratio than the rear axle (this ratio being determined substantially by added load). The design problems discussed below in relation to the addition redundancy can therefore be solved particularly well for the front axle.

In the case of two-circuit redundancy, the principle of the addition redundancy can also utilized for braking of the rear axle. However, since the design is more difficult, as mentioned earlier, the principle of switched redundancy can also be used for the rear axle, especially since it is possible to rely on a very secure front axle redundancy, which thereby makes the rear axle design less critical.

The reduced criticality of rear axle redundancy, as mentioned above, may however ultimately lead to a general abandonment of a two-circuit redundancy, with only one reliable single-circuit redundancy being provided for the front axle. Since matters of cost also play a role in addition to considerations relating purely to technical safety, it is reasonable to assume that technology will develop in the direction of single-circuit front axle redundancy and that the two-circuit redundancy will experience diminished significance. For this reason, the invention will be explained herein in accordance with the main aspect of its application, i.e. with a single-circuit redundancy. This will be followed by an explanation as to how such principles may also be expanded to a two-circuit redundancy.

Referring now to the figures, and in particular FIG. 1, the connection of the operating unit of the brake signal transmitter 1 to other units of the braking system is depicted.

The brake signal transmitter 1 is actuatable by a driver of the vehicle via a brake pedal 5 which acts upon a actuating ram 6. Actuation is detected electrically in the sensing device 2 and the corresponding sensor measurement signal is transmitted via an electric cable 14 to an input of an electronic vehicle control system 7. Based upon this sensor measurement signal, an electrical signal is formed for the level control of the braking pressure. This control signal is transmitted via an electrical connection 15 to a braking pressure modulator 3 which is integrated into the brake signal transmitter. The braking pressure modulator 3 produces a control pressure based on the electrical control signal which is augmented by an air quantity in a relay valve 4. The brake signal transmitter 1 is connected via a pneumatic channel to an air supply 8.

The braking pressure is released at the pneumatic output 9 of the relay valve 4. The pneumatic output 9 is in turn connected via pneumatic lines to the brake cylinder 12. Normally, an ABS control valve 13 is intercalated between the pneumatic output 9 and the brake cylinder 12 for providing brake-slip controlled reduction of the braking pressure. With regard to the front axle typical of the present example under consideration, there are usually two brake cylinders present. Regarding the ABS control valve, either one (axle control) or two (wheel control) may be present.

According to the principle of addition redundancy, the excursion of the actuating ram 6 is provokes two different actions. As explained, in accordance with the first of such actions, an electrical pressure component is produced electrically via a braking pressure modulator. Secondly, a mechanical pressure component is produced mechanically.

Using an adding device contained in the brake signal transmitter 1, the electrical and mechanical pressure components are added up, and this sum of pressures represents the braking pressure delivered by the brake signal transmitter 1. If the electrical pressure component is omitted, the mechanical pressure component automatically constitutes the braking pressure.

Strictly speaking, physical magnitudes corresponding to the effect of the electrical or mechanical pressure components are added up by the adding device, whereby a pressure component may be real or virtual (the component cannot be measured as a "pressure" at any point within the brake signal transmitter).

The addition device for the production of the braking pressure therefore has two inputs. At these inputs, physical magnitudes corresponding to the braking pressure components are applied. One input serves for the application of a first physical magnitude which is derived from the driver actuation (mechanical pressure component), and the other input serves for the application of a second physical magnitude which is formulated by the control signal of the vehicle control system for the braking pressure modulator (electrical pressure component). As explained below, physical magnitudes may be present in the form of force or pressure, depending on the embodiment.

Figure 2:
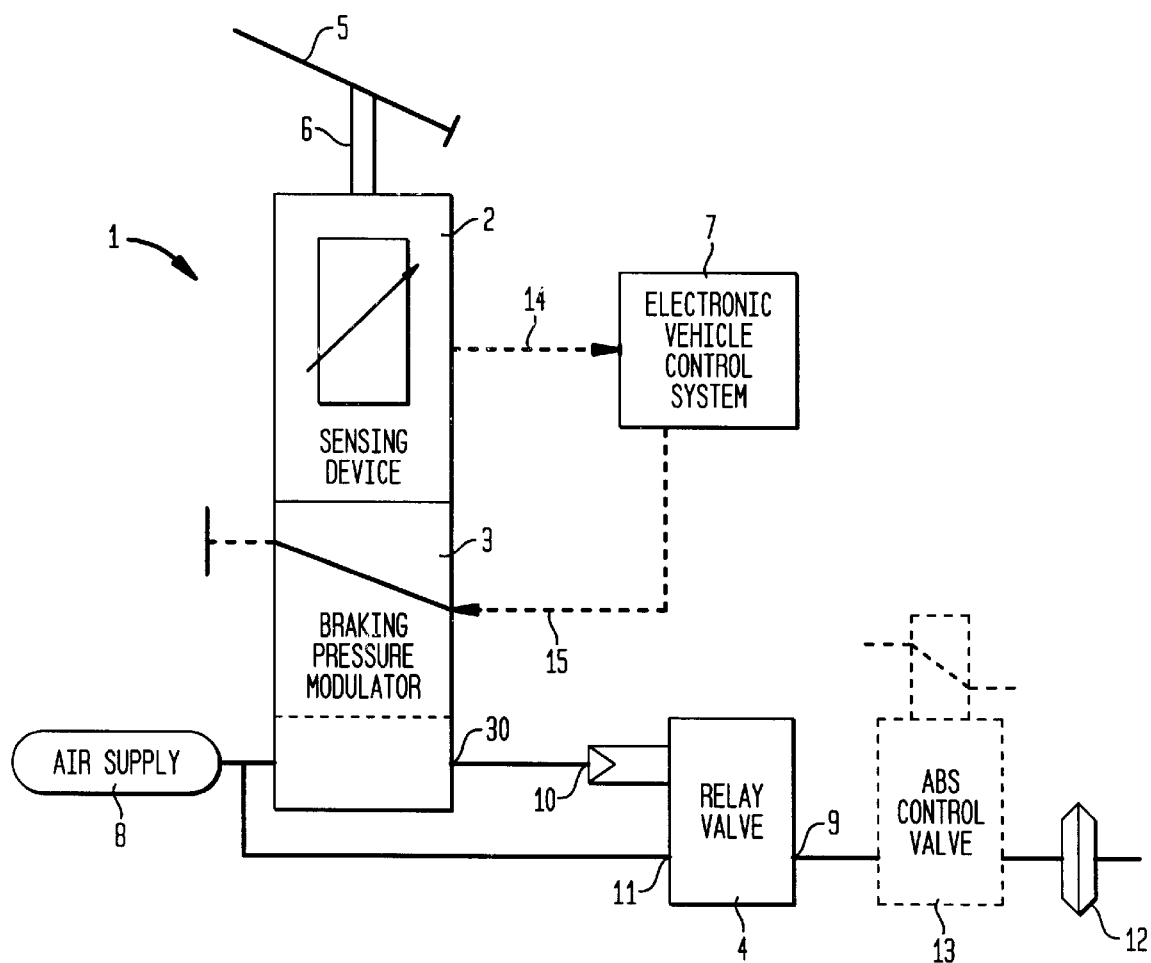
FIG. 2 is a schematic view of an embodiment of the brake signal transmitter in which a sum is formed by adding up two forces in the production of the braking pressure, i.e. the sum of a force corresponding to the driver actuation and a magnetic force of a proportional valve which constitutes the braking pressure modulator.

In the embodiment of the brake signal transmitter according to FIG. 2, the braking pressure modulator 3 is designed as a solenoid-operated proportional valve. In accordance with this embodiment, the first and second physical magnitudes represent a force, for which a more detailed explanation is given below with respect to FIG. 4.

The relay valve 4, which is reinforcing the air quantity, is provided in the form of an external device outside the brake signal transmitter 1. The proportional valve 3, acting as a braking pressure modulator, produces a control pressure which is transmitted via an output 30 of the braking pressure modulator 3 to the relay valve 4 at a control pressure input 10. The air supply 8 is connected to a supply pressure input 11.

Insofar as the relay valve 4 is installed separately with a corresponding nominal width, the brake signal transmitter 1 can be embodied as a device having a small volume.

Figure 3:
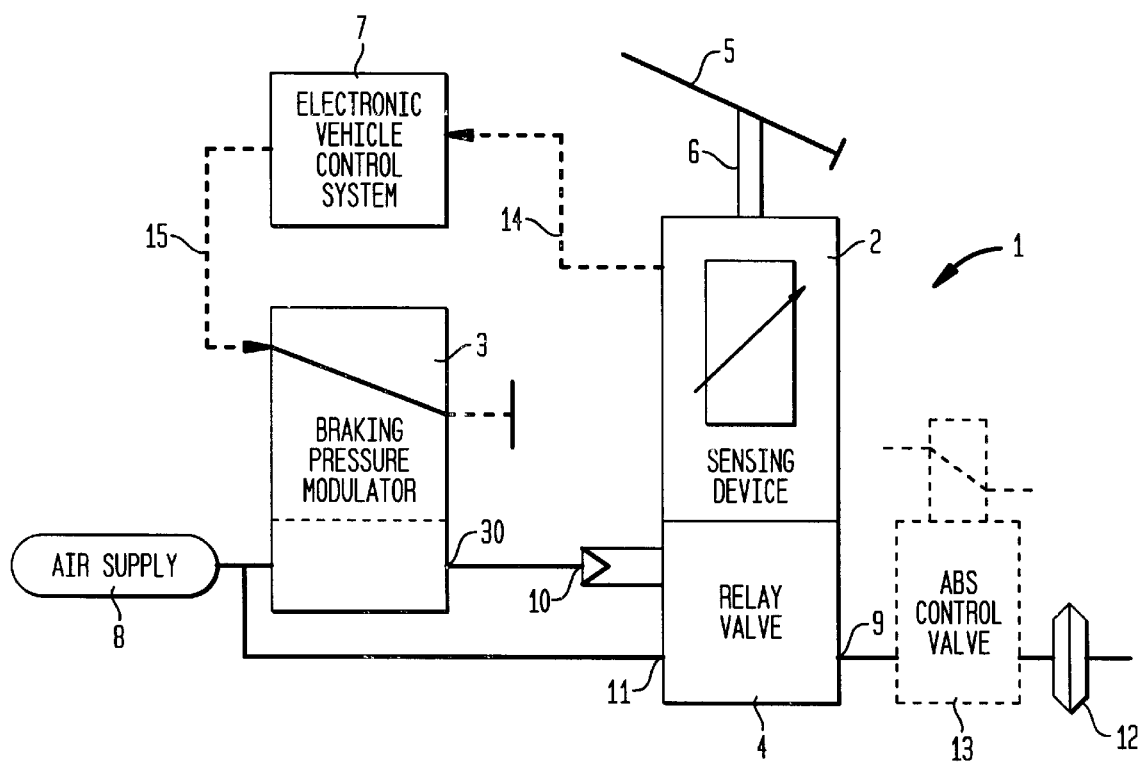
FIG. 3 is a schematic view of an embodiment of the brake signal transmitter in which the sum of two forces is calculated for the production of the braking pressure, i.e. the sum of the driver-actuated corresponding force and of a force derived from the pressure which is supplied to the brake signal transmitter by the braking pressure modulator, and in which the valve is designed in form of an air-quantity augmenting relay valve.

Turning now to FIG. 3, in accordance with the embodiment depicted therein, the brake signal transmitter 1 is provided as an external device, but the relay valve 4 is integrated in the brake signal transmitter 1.

The control pressure produced by the braking pressure modulator 3 is transmitted via the control pressure output 30 to the control pressure input 10 of the relay valve 4. In this embodiment, the first physical magnitude consists of a force, and the second physical magnitude of a pressure, for which a more detailed explanation is given below with respect to FIG. 5.

The braking pressure modulator 3 can also be provided in the form of a solenoid-actuated proportional valve in this embodiment.

Alternatively, the braking pressure modulator 3, can also be comprised of switching solenoid valves, as is known, for which at least two valves are required. With such a valve combination, the control pressure formed in the braking pressure modulator 3 is raised via an admission valve and lowered via a venting valve. The air admission valve connects the control pressure output 30 in a switched state to the supply pressure, and the venting valve connects the control pressure output 30 to the atmosphere in the switched state. Through alternating pulsations of the two valves, the desired control pressure is thus attained.

The pulsation is carried out by the vehicle control system which sets the desired control pressure in a closed control loop by measuring the current control pressure by means of a pressure sensor and actuates the air admission or the venting valve, depending on the existing deviation from the desired pressure. For such purposes, rapidly switching solenoid valves are suitable, and have a comparatively low nominal width under these circumstances. To increase the air quantity, it is therefore possible, instead of providing one air admission valve, to provide, for example, two air admission valves, and, for example, two venting valves for the venting valve. The electrical connection 15 consists of a number of cables which are required for the actuation of these air admission and venting valves.

In an embodiment of the braking pressure modulator 3 with pulsating solenoid valves, the comparatively low cost for switching solenoid valves is deemed advantageous.

Since switching solenoid valves require only minimal space, they can also be built into the brake signal transmitter. In such an embodiment, it is furthermore possible to structurally combine at least the part of the vehicle control system 7 assigned to braking, to the extent that it produces the signal for the electrical pressure components, with the brake signal transmitter 1.

Figure 4:
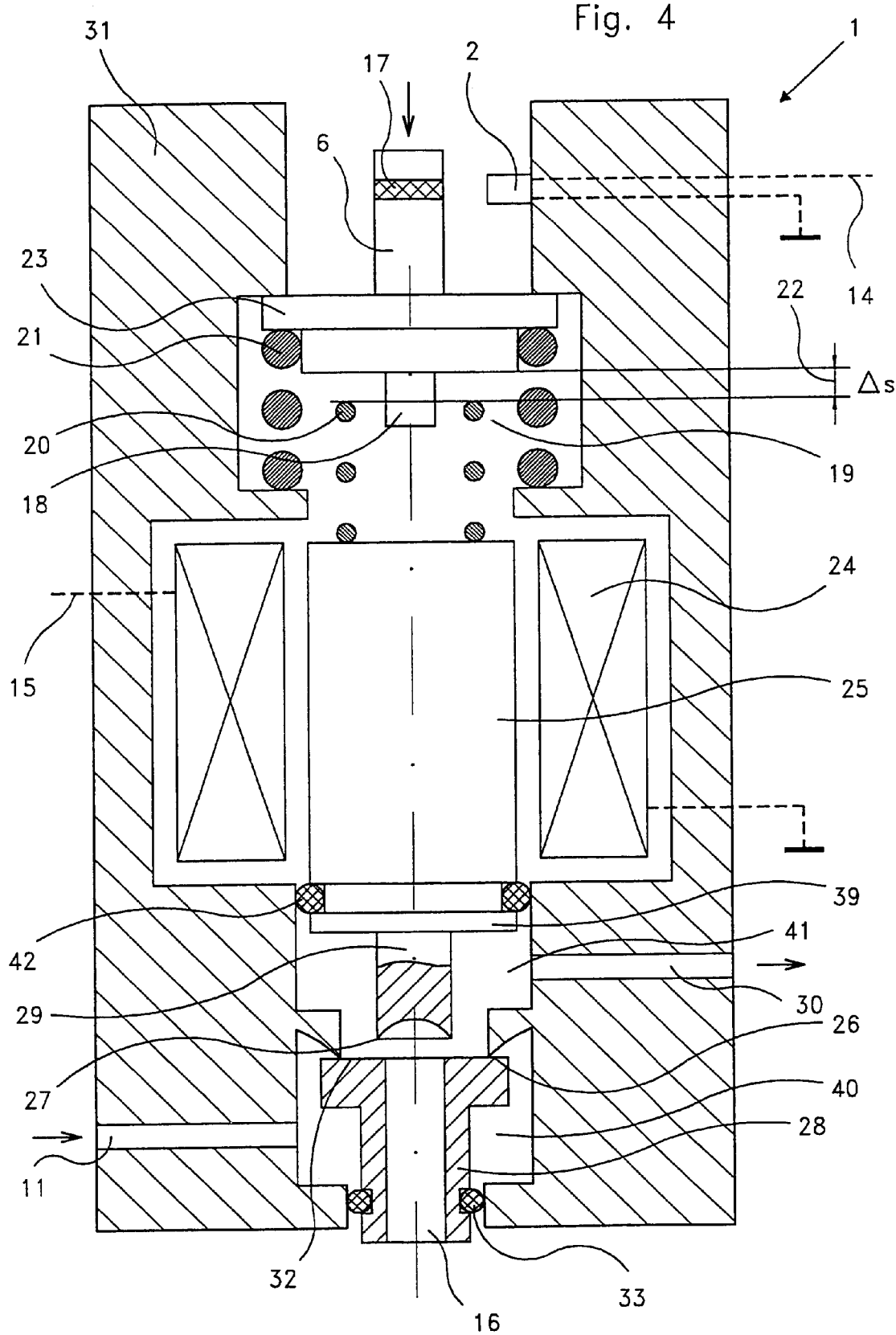
FIG. 4 is a cross-sectional schematic view of the brake signal transmitter according to the principle of FIG. 2, in which the armature of the proportional valve represents the addition element.

Referring now to FIG. 4, the practical embodiment of a brake signal transmitter 1 according to FIG. 2 is depicted. The electrical sensing device 2 for the detection of the displacement of actuation at the actuating ram 6 is provided in the form of a magnetoresistive sensor which interacts with a permanent magnet installed in the actuating ram 6. The sensor determines the position by evaluating the angle of the field line produced by the permanent magnet 17. Alternatively, any other displacement sensor can also be used without departure from the contemplated scope of the invention. The air supply 8 is connected to a pressure plate 23.

The actuating mechanism is furthermore provided with a first spring 20 and a second spring 21, both located in a spring chamber 19, whereby the second spring 21 supports the pressure plate 23 relative to the housing 31.

The magnetic portion of the proportional valve contains a magnet coil 24 and an armature 25. The valve portion of the proportional valve contains a valve piston 39 mounted on the extension of the armature 25, a valve body 28 with a sealing surface 32, an air supply pressure chamber 40, a braking air pressure chamber 41 for the control brake pressure, a surrounding sealing edge 26 continuous with the housing which, together with the sealing surface 32, constitutes an air admission sealing seat (in the shown position, the air admission sealing seat is closed) and a surrounding sealing edge 27 attached at the end of the actuating element 29, which, together with the sealing surface 32, constitutes a venting sealing seat (in the shown position, the venting sealing seat is open).

The air supply pressure chamber 40 is sealed off from the atmosphere by the seal 33 installed in the valve body 28, and the braking air pressure chamber 41 is sealed off from the atmospheric pressure prevailing in the area of the magnet coil-armature system 24, 25 and the spring chamber 19 by means of the seal 42.

The second spring 21 acts as a restoring force for the range of actuation of the actuating ram 6 and determines, through the lever ratio of the brake pedal, the required foot pressure to be applied by the driver for a given braking action. Since the second spring 21 is a stronger spring than the first spring 20, the influence of the first spring 20 is negligible, and the restoring force is determined only by the actuating path and the spring constant of the second spring 21. By using two springs, a separation of functions is provided, insofar as the first spring 20 serves for the pneumatic actuation of the allowed mechanical pressure components, and the second spring 21 serves for the realization of a particular "braking feeling" for the driver.

The operation is explained next, wherein it is to be initially assumed that the magnet current fed by the vehicle control system via the electrical connection 15 equals zero and that therefore no magnetic force is exerted upon the armature 25. The position of the components in the brake signal transmitter 1, as shown, represents the non-actuated state. In this state, the valve body 28 is pressed by the pressure prevailing in the air supply pressure chamber 40 via its effective annular surface on the side towards the armature 25 with its sealing surface 32 against the sealing edge 26, so that the inlet valve is closed. The braking air pressure chamber 41 is vented through the venting outlet 16 in this state, so that no control braking pressure is emitted.

The first spring 20 is shorter than the second spring 21 by a distance Δs, identified in FIG. 4 as reference numeral 22. This means that although a restoring force is exerted on the actuating ram 6, within a very short range of actuation, the position of the armature 25 remains unchanged and, as in the unactuated case, no control braking pressure is yet produced. Only when the "empty run" Δs 22 has been overcome, does the first spring 20 press against the lower edge of the pressure plate 23, and as the displacement of actuation further increases, a force is exerted via the first spring 20 upon the armature 25, so that the latter is displaced in the direction of the valve body 28. The force produced by the first spring 20 now acts upon the valve body 28. As a result, the sealing surface 32 is lifted off the air admission sealing edge 26, and air flows from the air supply pressure chamber 40 into the braking air pressure chamber 41.

The pressure building up in the braking air pressure chamber 41 exerts a force via the active annular surface of the valve piston 39 upon the armature 25 which opposes the force produced by the first spring 20. As soon as the counteracting force has become equal to the spring force, the actuating element 29 is pushed back in the direction opposite to that of the biasing force imposed by the spring 20. As it is thus pushed back, the valve body 28, the sealing surface 32 of which is still pressed against the venting sealing edge 27, follows this movement, so that the air admission sealing edge 26 comes again into contact with the sealing surface 32 (for purposes of this explanation regarding the general operation, possible influences due to friction are not taken into consideration). Thus the state is reached in which the air admission, as well as the venting sealing seat, are closed, and in which a pressure is determined in the braking air pressure chamber 41 which is proportional to the force exerted by the first spring 20 upon the armature 25 on basis of Hook's law.

Since the spring-generated pressure determination starts with a threshold actuation range of Δs, the characteristic line of the mechanical pressure component contains a straight segment, the slope of which is determined by the spring constant of the first spring 20 and the active annular surface of the valve piston 39. This straight segment is represented by the reference numeral 50 in FIG. 6a.

If this displacement is reduced from a given displacement of actuation, the braking pressure determined in the braking air pressure chamber 41 at the point in time of the reduction is too high, and the valve piston 39 is resultantly displaced against the yielding spring force in a direction of the first spring 20. In this process, the venting sealing edge 27 lifts off from the sealing surface 32 so that air is blown off into the atmosphere from the braking air pressure chamber 41 via the venting outlet 16. Venting continues until the pressure existing in the braking air pressure chamber 41 corresponds to the reduced displacement of actuation. With the reduction of pressure, the actuating element 29 is displaced in the direction of the valve body 28, and at the point in time when the new equilibrium is established between the spring force of the reduced displacement of actuation and the counteracting force produced by the pressure on the valve piston 39, the venting sealing edge 27 becomes once more seated on the sealing surface 32, thus assuming the final position.

Thus, the level of pressure in the braking air pressure chamber 41 continuously follows the range of actuation of the actuating ram 6. This leveled pressure represents the above-mentioned pressure component.

When a magnet current is fed via the electrical connection 15, a force corresponding to the magnitude of the magnet current acts upon the armature 25. The armature 25 is an adding device in which an input is provided for a first physical magnitude which is derived from the displacement of actuation according to the above-detailed explanations by the function of the first spring 20, and in which, another input for a second physical magnitude is provided and which is determined as a function of the magnetic current fed via the electrical connection 15 from an output of the vehicle control system. Both physical magnitudes are added together as forces in the armature 25 acting as an adding element. In the embodiment of FIG. 4, the first, as well as the second, physical magnitudes therefore each represents a force.

A spring is provided for the above-mentioned motor vehicle brake valve according to DE-A1-42-32 146, (therein identified as a rubber stepping spring 3) which interacts with a piston (therein identified as a first piston 2) to produce the pneumatic leveling of the braking pressure. Several basic points of view for the sizing of such a motor vehicle brake valve are discussed below.

The sizing of the spring and the piston is indicated by the braking pressure to be leveled and the desired degree of precision which is to be maintained. The hysteresis to be observed in this manner for the braking pressure and the air quantity to be leveled by the valve seats demands that a certain lower limit must be considered in selecting the surface of the piston. A maximum spring force $F_{max}$ which the spring must supply is derived, based upon this surface and the maximum braking pressure.

The maximum range of spring $s_{max}$ assigned to this force must be then be determined according to the determination of the maximum spring force $F_{max}$ (determination of the spring constants). If the displacement of spring is also to be sensed with a resolution that is sufficient for the requirements of the vehicle control system, as is the case with the brake signal transmitter according to the invention, a suitable resulting value of the maximum displacement of spring $s_{max}$ may not be lower than a certain amount. Thus, the maximum spring force $F_{max}$ and the maximum range of spring $s_{max}$ is determined by these basic sizing considerations.

In leveling the maximum brake pressure, the spring is therefore compressed in such manner that it contains a potential energy defined by the following equation 1:

$$E = \tfrac{1}{2} * s_{max} * F_{max} \qquad [1]$$

This energy is produced by the driver by applying the foot force $F_{1max}$ at the brake pedal and covers the displacement of pedal $s_{1max}$ at the brake pedal. A lever translation of the foot force $F_1$ into spring force F takes place at the brake pedal, whereby the lever translation ratio ü is given by the ratio of the lever length from the point of attack of the foot force to the pivot point and the lever length from the point of attack of the spring to the pivot point of the brake lever.

The lever translation ratio ü determined in this manner is used to determine the maximum foot force according to the following equation 2:

$$F_{1max} = F_{max}/ü \qquad [2]$$

Similarly, the lever translation ratio ü is used to determine and the maximum foot displacement according to the following equation 3:

$$s_{1max} = S_{max} * ü \qquad [3]$$

In a motor vehicle brake valve according to the state of the art equipped with a stepping spring, a maximum spring force as indicated by the design can thus be reduced through the selection of the lever translation ratio ü in such manner that the driver need only supply the ü—the part of this force with his foot; at the same time however, he must supply the ü—the actuating displacement. A saving in force must therefore always be achieved at the cost of a corresponding increase in displacement.

Contrary to the state of the art for the above-mentioned motor vehicle brake valve, only one braking control pressure is to be leveled by the brake signal transmitter 1 in the embodiment according to FIG. 4, and therefore the surface of the valve piston 39 can be provided in a form comparatively much smaller, since no large valve seats need be actuated by the piston for a corresponding increase of air quantity. With smaller valve seats, a smaller piston surface is sufficient, and a lesser spring force therefore permissible, such that only a comparatively weak spring with low potential energy is required for the pneumatic leveling.

The comparatively stronger second spring 21 serves to set the brake feeling for the driver. The maximum spring force of this spring can be selected completely independent of the pneumatic data, thereby permitting such selection to follow entirely the particular wishes of the vehicle manufacturer. With this freedom of choice regarding the maximum force and its translation for driver actuation while using a suitably selected lever translation ratio ü, the brake feeling can, to a large extent, meet the different objectives of various vehicle manufacturers. A desired change with respect to the actuation force requirement of the brake signal transmitter therefore merely requires replacement of the second spring 21.

To enable the driver to sense from a slight pressure point that braking begins, the second spring 21 is advantageously placed in a slightly pre-stressed state.

Since the displacement of actuation and the force of actuation are clearly tied to each other via the second spring 21, it is possible to provide a sensor measuring the force of the second spring 21 instead of the displacement sensor 2. The dependency of a certain quantity of the brake signal transmitter on the displacement of actuation is thus equivalent to the dependency of this quantity on the actuating force.

Figure 5:
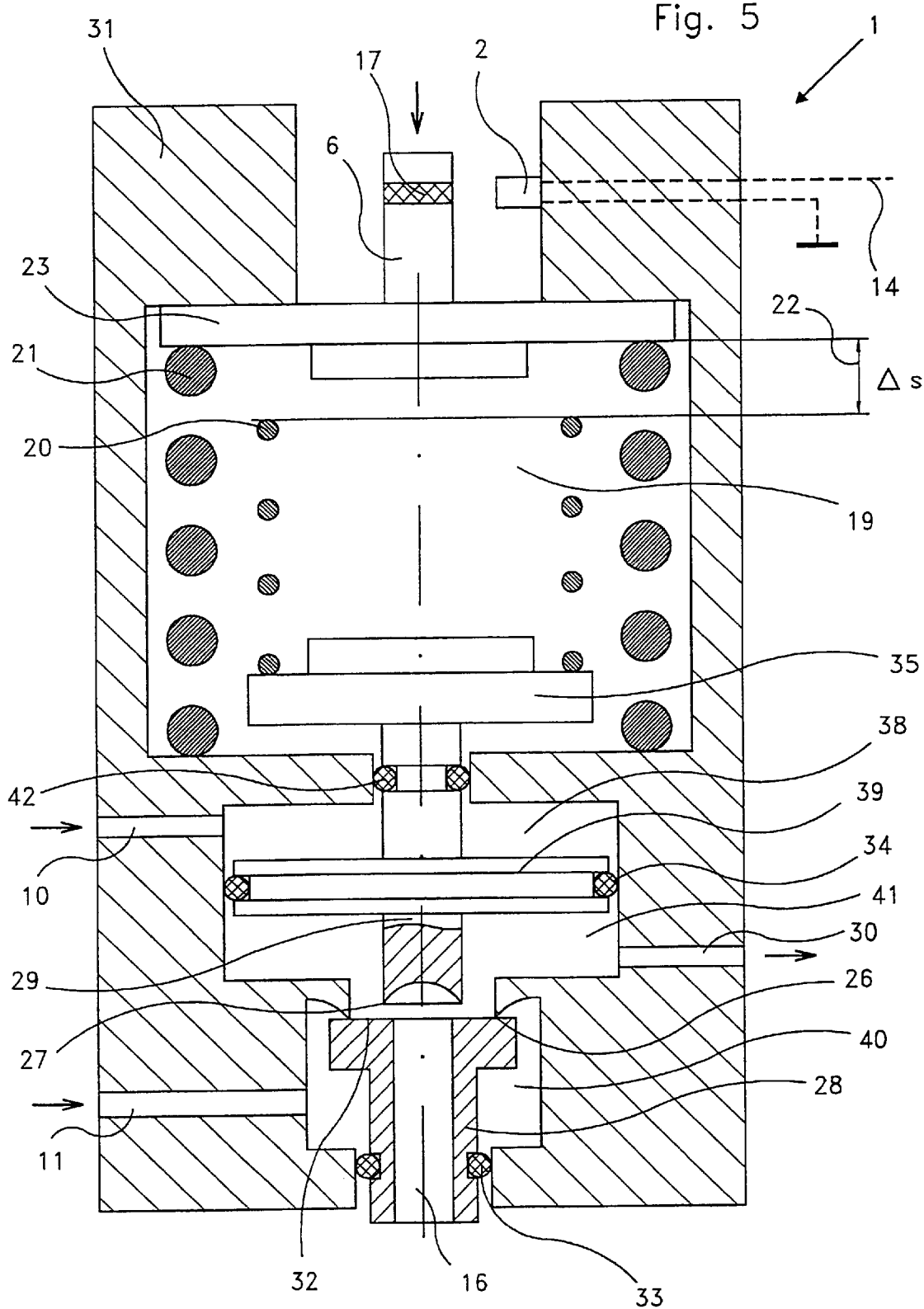
FIG. 5 is a cross-sectional schematic view of the brake signal transmitter according to the principle of FIG. 3, in which the valve piston of the valve represents the addition element, but which is not primarily designed as a relay valve.

Turning now to FIG. 5, the practical embodiment of a brake signal transmitter 1 according to FIG. 3 is depicted. The actuating mechanism of the brake signal transmitter according to FIG. 5 which is prompted by the actuating ram 6, including the spring arrangement and the pneumatic valve system controlled by the actuating element 29, has already been explained by the corresponding explanations of the brake signal transmitter of FIG. 4. In the embodiment according to FIG. 5, the braking air pressure chamber 41 is separated from a control air pressure chamber 38 by a piston seal 34 on the valve piston 39. A force-introducing intermediate piece 35 serves to transmit the force produced by the first spring 20 to the valve piston 39. The force of the first spring 20, as well as the pressure prevailing in the control air pressure chamber 38, both act upon the valve piston 39.

The pressure produced by the braking pressure modulator is applied at the control pressure input 10, and the pressure present at the control pressure output 30 is guided to the external relay valve.

The valve piston 39 is thus an addition element for which, in turn, two inputs of physical magnitudes are provided. The first physical magnitude is derived from the range of actuation and represents a force, while the second physical magnitude is derived from an output of the vehicle control device and represents a pressure.

If an embodiment of the brake signal transmitter is to be designed for a user who consistently requires a given brake feeling, it may be advisable to omit the determination of the brake feeling described in the description of FIG. 4 based upon the second spring 21. The diameter of the valve piston 39 can also be enlarged such that valve seats with greater air capacity can be actuated. As a result, the pressure emitted by the brake signal transmitter at the control pressure output 30 supplies an air capacity which renders the utilization of a downstream air quantity augmenting relay valve unnecessary. Such a brake signal transmitter is shown in FIG. 2 (the pneumatic output of the brake signal transmitter directly represents the relay valve pressure output 9).

The required strength of the first spring 20 is determined as a function of the enlarged piston diameter. The second spring 21 must be reduced to the extent to which the first spring 20 is reinforced, since it no longer solely responsible for the determination of the brake feeling.

As mentioned above, certain correlations between air quantity, valve size and control piston diameter which result in a particular hysteresis are present in a conventional motor vehicle brake valve. These correlations also exist in principle for the brake signal transmitter according to the invention, but an increased hysteresis of the mechanical pressure components which occurs with smaller control pistons does not have any effect on the braking behavior. This is because the electrical pressure component is adjusted in such manner by the electronic brake value control, as explained in further detail below, that the desired overall braking pressure is achieved.

Figure 6A:
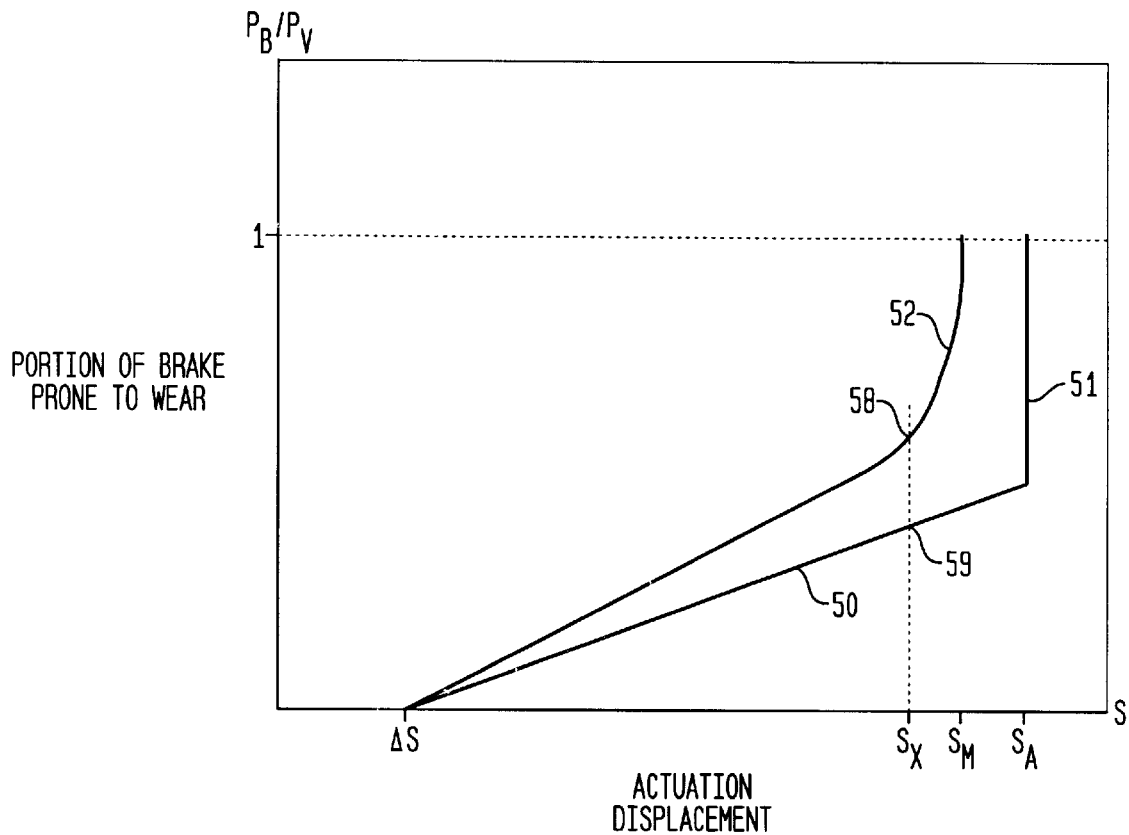
FIG. 6a is a graphical representation of characteristic lines of the pressures for a brake signal transmitter according to FIG. 4 triggered as a function of the driver actuation in a wear-prone brake.

As mentioned earlier herein, the straight segment 50 shown in FIG. 6a represents the mechanically produced pressure component, i.e. the redundancy pressure component as a function of the displacement of actuation s. The base point of the straight segment is at an actuation displacement of Δs, since no redundancy pressure is produced for smaller actuating displacements. The straight segment extends from the base point with a certain positive slope, which is explained above, up to an actuation range $s_A$, where the stud-like widening 18 of the pressure plate 23 presses against the armature 25.

Once the stop has been reached, the pressure plate 23 acts directly on the armature 25, so that each additional increase of the actuating range, no matter how small, causes the air admission seat 26, 32 to be opened directly, such that the pressure abruptly increases. At this point, the displacement control of the pneumatic valve changes into a force control, as is shown by the straight segment 51.

The driver controls the braking pressure in this region by applying the force of his foot. This behavior does not present a problem, since the branch of the characteristic line corresponding to the straight segment 51 only takes effect when the electronically produced braking pressure component is missing, for example, due to a failure of the electronic system, and in which the redundancy pressure takes effect. If this emergency occurs during a braking action, the driver notices, while actuating the brake, that the braking pressure is suddenly diminished (with an actuation displacement $s_x$ shown in FIG. 6a, the braking pressure decreases according to the work point 58 to the curve mentioned below of the overall braking pressure 52 to the pressure according to work point 59 on the straight segment 50), whereupon the driver intuitively actuates the brake with increased force and produces the air supply pressure as maximum braking pressure via the characteristic line branch 51. It is important that in the event of such an emergency, the driver is able to, at any time, safely effect full braking when necessary. Any irregularity in passing over from the characteristic line branch 50 to the characteristic line branch 51 is insignificant.

The combination of the characteristic line branches 50 and 51 is represented by the characteristic line of the mechanically produced pressure components.

So far, braking behavior when the threshold Δs is exceeded has been discussed, whenever a mechanical pressure component is produced. This means that a brake cylinder of the friction brake of the vehicle is subjected to a braking pressure. In addition to this wear-prone brake, many vehicles are also equipped with a non-wearing brake, for example, in the form of a retarder.

With only a slight actuation of the brake pedal, i.e. with actuation ranges less than Δs, the non-wearing brake should be actuated. Implementation of this is possible since the sensor 2 also transmits a corresponding signal to the vehicle control system 7 for these brake actuations. The vehicle control system 7 evaluates the sensor signal and actuates, for example, the retarder, according to the magnitude of the value measured by the sensor. Since this part of the sensing device 2 is not part of the invention, the actuation of a non-wearing brake is not indicated in the drawing.

Figure 6B:
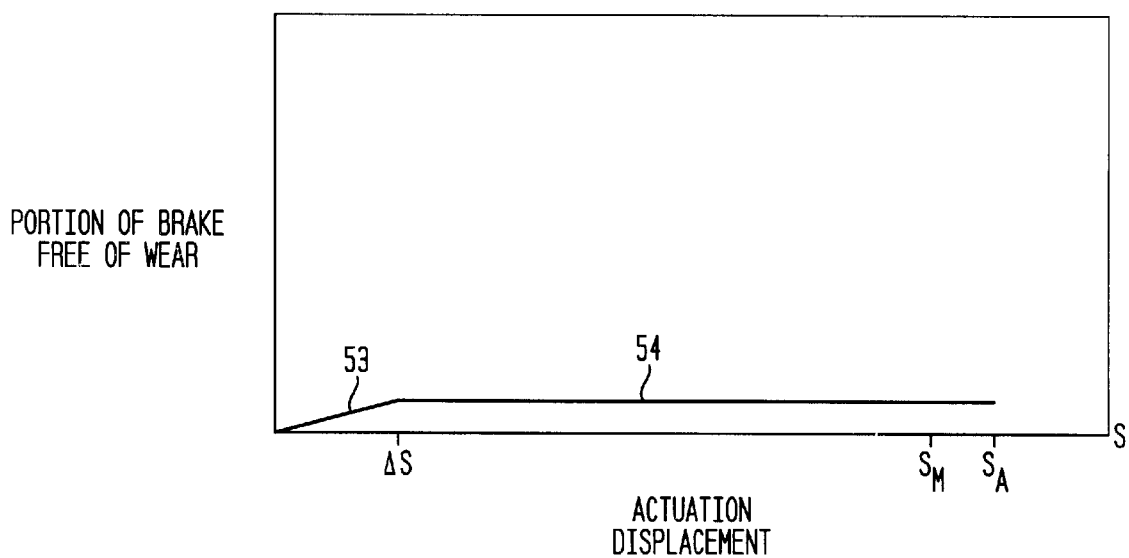
FIG. 6b is a graphical representation of characteristic lines of the pressures for a brake signal transmitter according to FIG. 4 triggered as a function of the driver actuation in a non-wearing brake.

FIG. 6*b* shows by way of example the effect of a brake acting without wear. As shown, the non-wearing brake portion first rises from an actuation displacement of zero in a linear manner 53 and at the actuating displacement Δs it reaches its maximum, whereby it is assumed that this value represents the maximum actuation of the retarder. For actuation ranges of more than Δs, this maximum non-wearing brake portion 54 is maintained. No unit is indicated on the ordinate of FIG. 6*b*. The non-wearing portion of the entire braking requirement is represented here in a magnitude which is equivalent to the magnitude of the ordinate shown in FIG. 6*a*, which, in that case, amounts to the ratio of the braking pressure $p_B$ to the air supply pressure $p_V$.

As indicated above, the curve 52 shown in FIG. 6*a* represents the total braking pressure of the wear-prone brake which is equal to the sum of the electrical pressure component produced by the braking pressure modulator 3 and the mechanical pressure component. As already mentioned, the vehicle control system 7 carries out an evaluation of the measured value delivered by the sensing device 2 by regarding this signal as a general braking requirement signal and assigning corresponding individual brake requirements to the braking components in the vehicle. Thus, the non-wearing brake signal is transmitted before the portion of the braking requirement which the wearing brake is able to meet, and the remaining portion is assigned to the wearing brake. Within the wearing brake, a division of the braking portions for front and rear axle is made, and for this purpose the actual lining thickness is scanned so that a pressure distribution taking into account the wear calculation may take place in a lower braking range relative to pressure, while in the higher braking range a factor such as the vehicle load is taken into account.

Since the manner of this attribution is known, only the general interaction of the characteristic braking lines is discussed below.

The curve 52 of the overall braking pressure in the example for the brake cylinder of the front axle shows a somewhat linear course for shorter actuation displacements (low values of s–Δs). Good gradation is desirable in this range. With greater actuation ranges, the braking pressure rises with increasing abruptness and reaches the supply pressure at a corresponding actuation displacement of $s_M$. This behavior coincides with the desire of the driver to attain maximum braking pressure as quickly as possible in the event of a situation requiring an emergency braking action.

The difference between the curve 52 of the overall braking pressure and the mechanical pressure component 50 (the redundancy pressure) represents the electrical pressure component.

A considerable advantage of the invention resides in the fact that the design of the electrical pressure component via the actuation displacement can be determined completely independent from the structure of the brake signal transmitter. In this manner, the different vehicle requirements and the different wishes of the vehicle manufacturer can be met without having to change the structure of the brake signal transmitter.

The overall braking effected on the vehicle via the actuation displacement is equal to the sum of the characteristic line of the non-wearing brake with branches 53, 54 according to FIG. 6*b* and the characteristic line of the overall braking pressure 52 according to FIG. 6*a*.

The course of events in the mechanically produced redundancy pressure, as shown in FIG. 6*a* via the actuation displacement with the inclined characteristic line branch 50 and the vertical characteristic line branch 51, also applies to the embodiment of the brake signal transmitter of FIG. 5. In this embodiment, the mechanical stop $s_A$ is reached when the lower edge of the pressure plate 23 comes into contact with the upper edge of the intermediate part 35.

The embodiments of the brake signal transmitter according to the invention discussed thus far are based on a single-circuit redundancy, as mentioned earlier herein. A brake signal transmitter with two-circuit redundancy can be realized by integrating an additional pressure control step for the production of an additional braking pressure component which acts independently of the explained mechanical pressure production system for the production of the addition redundancy pressure for the front axle, whereby the pressure it produces is provided as a redundancy pressure for the rear axle, preferably as a switched redundancy.

It is known from the motor vehicle brake valve according to DE-A1-42 32 146 (U.S. Pat. No. 5,380,073), mentioned above, how the first braking circuit, in the form of a rear axle circuit, is subjected to pressure first via a first work chamber (therein identified as a first work chamber 60) when the brake valve is actuated. The pressure for the second braking circuit, in the form of a front axle circuit, is transmitted via a second work chamber (therein identified as a second work chamber 44). The second work chamber is connected pneumatically to the first work chamber so that when a pressure is transmitted to the first work chamber, a pressure is concurrently produced in the second work chamber. In addition, a mechanical coupling exists between the first and the second work chambers so that if the pressure fails in the first work chamber, the pressure in the second work chamber is then produced on the basis of the mechanical coupling.

The brake signal transmitter according to the invention, for example, the embodiment according to FIG. 4, can be expanded to a brake signal transmitter with two-circuit redundancy by applying this known principle. The above-mentioned additional pressure control step is actuated as a first pressure control step directly from the pressure plate 23 by building in a corresponding first additional valve piston which actuates the inlet and outlet seats of the additional pressure control step. The first additional valve piston is subjected to force from the pressure plate 23 by an additional spring corresponding to the redundancy pressure (a weak spring without shortening of length) instead of by the first spring 20. The strong second spring 21 continues to act as the spring determining brake feeling. For the additional pressure control step, an additional work chamber is created within which a second additional valve piston is provided, and which is subjected to the pressure of the additional pressure control step. The described arrangement, consisting of an armature 25 and of the valve elements 26, 27, 28 supplied by the armature, is located below the work chamber of this newly inserted pressure control step.

The first spring 20 is actuated by the additional pressure control circuit by letting the pressure produced by the additional pressure circuit act via the second valve piston upon this spring. The delayed pressure rise cannot be achieved in this case by a shortening of the structural length, but rather by building in the first spring without shortening its constructive length and by pre-stressing it as a function of the desired delayed pressure rise. At the same time, a rigid coupling connection to the armature 25 is established by displacing the actuating ram 6 in the event of a failure of the pressure in the additional pressure control circuit, so that the armature is displaced as explained above (see explanations regarding FIG. 4) in order to mechanically produce the addition redundancy pressure.

In accordance with the brake signal transmitter according to the invention, one pressure component is produced by mechanical means, and one pressure component by electrical means$_{max}$ An actuator based on the physical principle of producing a force via a magnet from the electrical magnitude of a current is used for the pressure component produced by electrical means. The force thus produced causes a displacement of mechanical elements in sealing seats so that open cross-sections are formed on the sealing seats through which the compressed air can flow, in and out, to effect the desired pressure change.

Generally, actuators with different operating principles can also be used, for example, actuators based on the Piezo principle. In accordance with such an actuator, an air gap is produced on a Piezo element as a result of an electrical voltage applied to the element. This air gap can be used for pressure-rising or pressure-reducing processes.

The selection of an actuator operating principle suitable for a particular application depends on the requirements of the application in issue. For this reason, the invention is not limited to one particular operating principle. It merely matters that some physical operating principle be used to produce the electrical pressure component, i.e. a principle which transforms an electric magnitude into a mechanical one which serves to produce the pressure component.

Having described preferred embodiments of the invention with reference to the accompanying drawing, it is to be understood that the invention is not limited to those precise embodiments, and that various changes and modifications may be effected therein by one skilled in the art without departing from the scope or spirit of the invention as defined in the appended claims.

What is claimed is:

1. A brake signal transmitter for a braking system installed in a vehicle including a vehicle control system, comprising:
   an actuating device for actuation of the brake signal transmitter by a driver of the vehicle;
   a sensor device for detecting driver actuation of said actuating device, the sensor device including an output connected to an input of the vehicle control system; and
   a pressure-producing device for producing a braking pressure in response to said driver actuation which includes an input for a first physical magnitude, the first physical magnitude being derived from the driver actuation, the pressure-producing device further including an additional input for a second physical magnitude, the second physical magnitude being an electrical signal derived from an output of the vehicle control system.

2. A brake signal transmitter according to claim 1, wherein the actuating device, the sensor device and the pressure-producing device are included in at least one module comprising the brake signal transmitter.

3. A brake signal transmitter according to claim 1, wherein the first physical magnitude is a force.

4. A brake signal transmitter according to claim 1, wherein the second physical magnitude is a force.

5. A brake signal transmitter according to claim 1, wherein the second physical magnitude is a pressure.

6. A brake signal transmitter according to claim 3, wherein the second physical magnitude is a pressure.

7. A brake signal transmitter according to claim 1, further comprising an addition device for forming a sum of influences imposed by the first and the second physical magnitudes.

8. A brake signal transmitter according to claim 7, further comprising a solenoid-controlled valve having an armature, the addition device being comprised of the armature.

9. A brake signal transmitter according to claim 7, further comprising a valve having a piston, the addition device being comprised of the piston.

10. A brake signal transmitter according to claim 8, further comprising a first spring for producing a force transmitted to the addition device corresponding to the driver actuation.

11. A brake signal transmitter according to claim 9, further comprising a first spring for producing a force transmitted to the addition device corresponding to the driver actuation.

12. A brake signal transmitter according to claim 10, wherein a shortening of a structural length of the first spring determines the beginning of a transmission of braking force associated with a given driver actuation.

13. A brake signal transmitter according to claim 1, further comprising a second spring which determines a characteristic line of a braking requirement.

14. A brake signal transmitter according to claim 5, further comprising a pressure control system for the production of pressure, the pressure control system including a combination of switched solenoid valves which comprise at least one admission valve and one venting valve.

15. A brake signal transmitter according to claim 14, wherein the pressure control system is combined structurally with a remaining portion of the brake signal transmitter.

16. A brake signal transmitter according to claim 1 in combination with at least a portion of the vehicle control system which is assigned to braking, said portion of the vehicle control system being structurally combined with a remaining portion of the brake signal transmitter.

17. A brake signal transmitter according to claim 1, wherein the pressure-producing device and an addition device for forming a sum of influences imposed by the first and second physical magnitudes function to provide a single-circuit redundancy.

18. A brake signal transmitter according to claim 17, wherein the single-circuit redundancy is based on the principle of addition redundancy.

19. A brake signal transmitter according to claim 1, further comprising an additional pressure-producing device for producing a braking pressure, the braking pressure produced by the additional pressure-producing device being determined by the driver actuation.

20. A brake signal transmitter according to claim 19, the additional pressure-producing device functioning to provide a two-circuit redundancy.

21. A brake signal transmitter according to claim 20, wherein redundancy provided by the additional pressure-producing device is based on the principle of switched redundancy.

22. A brake signal transmitter according to claim 1, wherein said at least one module includes a pedal box which is provided as a prefabricated system support in the vehicle.

* * * * *